(12) United States Patent
Shin et al.

(10) Patent No.: US 11,157,342 B2
(45) Date of Patent: Oct. 26, 2021

(54) MEMORY SYSTEMS AND OPERATING METHODS OF MEMORY SYSTEMS

(71) Applicant: Samsung Electronics Co., Ltd., Suwon-si (KR)

(72) Inventors: Wonjae Shin, Seoul (KR); Tae-Kyeong Ko, Hwaseong-si (KR); Dae-Jeong Kim, Seoul (KR); Sung-Joon Kim, Hwaseong-si (KR); Wooseop Kim, Seoul (KR); Chanik Park, Seongnam-si (KR); Yongjun Yu, Suwon-si (KR); Insu Choi, Hwaseong-si (KR); Hui-Chung Byun, Hwaseong-si (KR); JongYoung Lee, Seoul (KR)

(73) Assignee: Samsung Electronics Co., Ltd.

( * ) Notice: Subject to any disclaimer, the term of this patent is extended or adjusted under 35 U.S.C. 154(b) by 72 days.

(21) Appl. No.: 16/164,103

(22) Filed: Oct. 18, 2018

(65) Prior Publication Data

US 2019/0310905 A1 Oct. 10, 2019

(30) Foreign Application Priority Data

Apr. 6, 2018 (KR) .................. 10-2018-0040148

(51) Int. Cl.
*G06F 11/07* (2006.01)

(52) U.S. Cl.
CPC ...... *G06F 11/0751* (2013.01); *G06F 11/0727* (2013.01); *G06F 11/0793* (2013.01)

(58) Field of Classification Search
CPC ............ G06F 11/0727; G06F 11/073; G06F 11/0751; G06F 11/0793; G06F 11/0772; G06F 11/1048
See application file for complete search history.

(56) References Cited

U.S. PATENT DOCUMENTS

| | | | | |
|---|---|---|---|---|
| 6,779,065 B2 * | 8/2004 | Murty | ................... | G06F 9/4812 710/260 |
| 7,447,943 B2 | 11/2008 | Vu | | |
| 8,365,015 B1 * | 1/2013 | Yu | ......................... | G06F 9/3863 714/16 |
| 8,589,763 B2 * | 11/2013 | Fukuda | ............... | G06F 11/1064 714/763 |
| 2005/0141535 A1 | 6/2005 | Kuo et al. | | |

(Continued)

FOREIGN PATENT DOCUMENTS

KR    1020110116404    10/2011

OTHER PUBLICATIONS

Office Action dated Aug. 20, 2020 for corresponding U.S. Appl. No. 16/218,720.

*Primary Examiner* — Bryce P Bonzo
*Assistant Examiner* — Michael Xu
(74) *Attorney, Agent, or Firm* — Myers Bigel, P.A.

(57) ABSTRACT

A memory system includes a processor that includes cores and a memory controller, and a first semiconductor memory module that communicates with the memory controller. The cores receive a call to perform a first exception handling in response to detection of a first error when the memory controller reads first data from the first semiconductor memory module. A first monarchy core of the cores performs the first exception handling and the remaining cores of the cores return to remaining operations previously performed.

20 Claims, 12 Drawing Sheets

(56) References Cited

U.S. PATENT DOCUMENTS

| | | |
|---|---|---|
| 2010/0293337 A1 | 11/2010 | Murphy et al. |
| 2014/0223226 A1* | 8/2014 | Yigzaw ............... G06F 11/1064 714/15 |
| 2016/0103613 A1 | 4/2016 | Oshins et al. |
| 2016/0188414 A1* | 6/2016 | Jayakumar ............... G11C 7/20 711/103 |
| 2016/0357665 A1* | 12/2016 | Lee ....................... G06F 3/0653 |
| 2017/0060434 A1 | 3/2017 | Chang |
| 2017/0153826 A1 | 6/2017 | Cho |
| 2018/0004591 A1 | 1/2018 | Volentine |
| 2019/0179750 A1 | 6/2019 | Moyer et al. |
| 2019/0294548 A1* | 9/2019 | Kraipak ............... G06F 12/0862 |
| 2020/0050362 A1 | 2/2020 | Lee et al. |

* cited by examiner

MEMORY SYSTEMS AND OPERATING METHODS OF MEMORY SYSTEMS

CROSS-REFERENCE TO RELATED APPLICATION

This application claims priority under 35 U.S.C. § 119 to Korean Patent Application No. 10-2018-0040148, filed on Apr. 6, 2018, in the Korean Intellectual Property Office, the entire content of which is incorporated by reference herein.

BACKGROUND

Embodiments of the inventive concepts relate to semiconductor devices, and, more particularly, relate to memory systems and operating methods of the memory systems.

A semiconductor memory may be used to store data by using semiconductor elements. The semiconductor memory may include a volatile memory, such as a dynamic random access memory and/or a static random access memory, and/or a nonvolatile memory such as a flash memory, a phase-change memory, a ferroelectric memory, a magnetic memory, a resistive memory, or the like.

In general, volatile memory supports a high-speed random access and may be used as a main memory of a computing system such as a personal computer, a server, or a workstation. The nonvolatile memory supports a large storage capacity and may be used as auxiliary storage of the computing system.

A storage class memory (SCM) is being researched and developed. The storage class memory that is being developed may be targeted for supporting both a large nonvolatile storage capacity and a high-speed random access. The storage class memory may be implemented with a nonvolatile memory.

The storage class memory may be used as a main memory, and may provide a larger capacity than a volatile memory which was previously used to implement a main memory. However, some of characteristics of the storage class memory may hinder the performance of the conventional ways to control the main memory.

SUMMARY

Embodiments of the inventive concepts provide memory systems for improving the performance of controlling a storage class memory based on characteristics of the storage class memory and operating methods of the memory systems.

According to an example embodiment, a memory system includes a processor that includes cores and a memory controller, and a first semiconductor memory module that communicates with the memory controller. The cores receive a call to perform a first exception handling in response to detection of a first error when the memory controller reads first data from the first semiconductor memory module. A first monarchy core of the cores performs the first exception handling and the remaining cores of the cores return to remaining operations previously performed.

According to an example embodiment, a memory system includes a processor that includes cores and a memory controller, and a first semiconductor memory module that communicates with the memory controller and includes a nonvolatile memory and a first random access memory. Responsive to a first error being detected when the memory controller reads first data from the first semiconductor memory module, a first monarchy core of the cores performs a first machine check on the first error and returns to an operation previously performed, regardless of a type of the first error.

According to an example embodiment, an operating method of a memory system which includes a processor including cores and a memory controller, and a semiconductor memory module includes detecting, by the memory controller, an error upon reading data from the semiconductor memory module, interrupting, by the cores, operations being currently performed, for exception handling of the error, starting, by a monarchy core of the cores, the exception handling, returning, by the remaining cores of the cores other than the monarchy core, to corresponding remaining operations of the interrupted operations, before the exception handling is completed, and returning, by the monarchy core, to a corresponding operation of the interrupted operations when the exception handling is completed.

BRIEF DESCRIPTION OF THE FIGURES

The above and other objects and features of the inventive concepts will become apparent by describing in detail example embodiments thereof with reference to the accompanying drawings.

DETAILED DESCRIPTION

Below, embodiments of the inventive concepts may be described in detail and clearly to such an extent that one of ordinary skill in the art may implement the inventive concepts.

Figure 1:
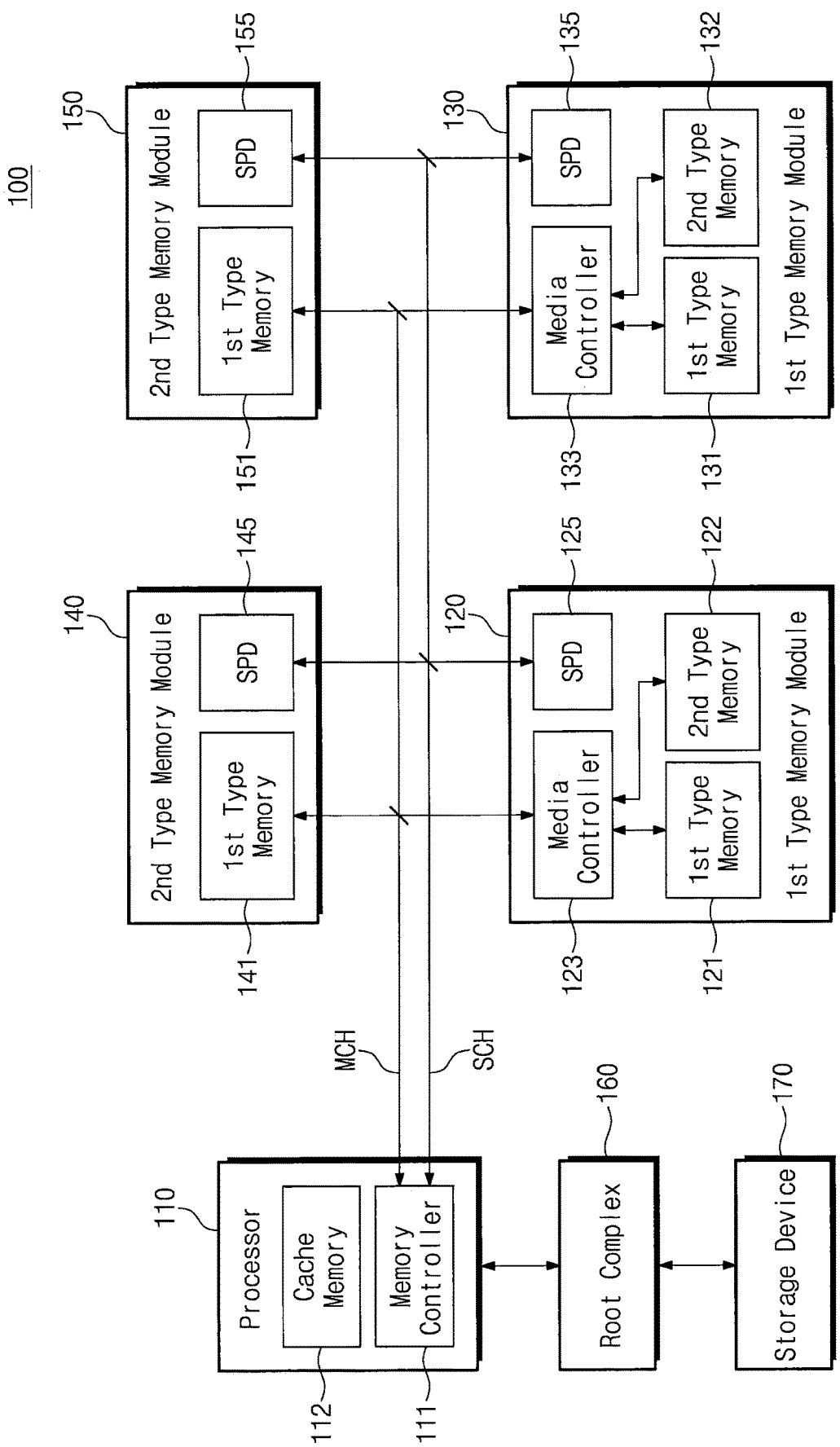
FIG. 1 is a block diagram illustrating a memory system according to an embodiment of the inventive concepts.

FIG. 1 is a block diagram illustrating a memory system 100 according to an embodiment of the inventive concepts. For example, the memory system 100 may include a server such as an application server, a client server, or a data server. For another example, the memory system 100 may include a personal computer or a workstation.

Referring to FIG. 1, the memory system 100 may include a processor 110, first to fourth memory modules 120 to 150, a root complex 160, and a storage device 170. The processor 110 may control components of the memory system 100 and operations of the components. The processor 110 may execute an operating system and applications and may process data by using the operating system or the applications.

The processor 110 may include a memory controller 111 and a cache memory 112. The memory controller 111 may access the first to fourth memory modules 120 to 150 through main channels MCH and sub-channels SCH. The cache memory 112 may include a high-speed memory such as a static random access memory (SRAM).

The first to fourth memory modules 120 to 150 may be connected with the memory controller 111 through the main channels MCH and the sub-channels SCH. The main channels MCH may be channels which are used to store data to the memory modules 120 to 150 (e.g., semiconductor memory modules) or to read data from the memory modules 120 to 150. The main channels MCH may include channels which are respectively provided with regard to the first to fourth memory modules 120 to 150.

The sub-channels SCH may provide additional functions associated with the first to fourth memory modules 120 to 150 that are different from storing or reading data to or from the first to fourth memory modules 120 to 150. For example, the first to fourth memory modules 120 to 150 may provide the memory controller 111 with their own unique information through the sub-channels SCH. The sub-channels SCH may include channels which are respectively provided with regard to the first to fourth memory modules 120 to 150.

The first to fourth memory modules 120 to 150 may be used as a main memory of the memory system 100. The first to fourth memory modules 120 to 150 may communicate with the memory controller 111 in compliance with one of standards of memory modules such as a dual in-line memory module (DIMM), a registered DIMM (RDIMM), and/or a load reduced DIMM (LRDIMM).

The root complex 160 may provide channels through which the processor 110 accesses various peripheral devices. For example, the storage device 170 may be connected to the root complex 160. The storage device 170 may include, for example, a hard disk drive, an optical disk drive, a solid state drive, etc.

In an embodiment, peripheral devices connected to the root complex 160 are not limited to the storage device 170. For example, the root complex 160 may be connected to various devices such as a modem, a graphics processing unit (GPU), and a neuromorphic processor.

The processor 110 may hierarchically manage the cache memory 112, the first to fourth memory modules 120 to 150 being the main memory, and the storage device 170. For example, the processor 110 may load data stored in the storage device 170 to the main memory including the first to fourth memory modules 120 to 150. The processor 110 may flush data of the data stored in the main memory that is to be backed up to the storage device 170.

A portion of a storage region of the main memory including the first to fourth memory modules 120 to 150 may be mapped onto the cache memory 112. When a specific storage space of the main memory is to be accessed, the processor 110 may determine whether the specific storage space has been mapped onto the cache memory 112.

In the case where the specific storage space has been mapped onto the cache memory 112, the processor 110 may access the specific storage space of the cache memory 112. In the case where the specific storage space is not mapped onto the cache memory 112, the processor 110 may map (or fetch) a specific storage space of the first to fourth memory modules 120 to 150 onto the cache memory 112.

When a storage space of the cache memory 112 is insufficient, the processor 110 may release a storage space previously mapped onto the cache memory 112. In the case where data of a storage space to be released have been updated, the processor 110 may flush the updated data to the first to fourth memory modules 120 to 150.

The first to fourth memory modules 120 to 150 may include heterogeneous memory modules. For example, the first and second memory modules 120 and 130 may be first type memory modules. The third and fourth memory modules 140 and 150 may be second type memory modules.

The first memory module 120 may include a first type memory 121, a second type memory 122, a media controller 123, and a serial presence detect (SPD) device 125. The second memory module 130 may include a first type memory 131, a second type memory 132, a media controller 133, and an SPD device 135. Below, the first type memory modules 120 and 130 will be described with reference to the first memory module 120.

The first type memory 121 may include a high-speed volatile memory, such as, for example, a dynamic random access memory (DRAM). The second type memory 122 may include a nonvolatile memory which is slower in speed than the first type memory 121 and is greater in capacity than the first type memory 121. For example, the second type memory 122 may include a flash memory, a phase change memory, a ferroelectric memory, a magnetic memory, a resistive memory, etc.

The media controller 123 may transfer an access command, which is transferred through a corresponding channel of the main channels MCH from an external host device, for example, the memory controller 111 and/or the processor 110, to the first type memory 121 or the second type memory 122. Depending on a command, the media controller 123 may exchange data with the external host device through the corresponding channel of the main channels MCH.

The media controller 123 may provide a storage capacity and/or a storage space of the second type memory 122 to the external host device. The media controller 123 may use the first type memory 121 as a cache memory of the second type memory 122.

For example, the media controller 123 may map a portion of a storage space of the second type memory 122 onto the first type memory 121. In the case where a storage space of the second type memory 122 associated with an access command from the external host device has been mapped onto the first type memory 121, the media controller 123 may transfer the access command to the first type memory 121.

In the case where a storage space of the second type memory 122 associated with an access command from the external host device is not mapped onto the first type memory 121, the media controller 123 may map (or backup) the storage space onto the first type memory 121 from the second type memory 122.

When a storage space of the first type memory 121 is insufficient, the media controller 123 may release a storage space previously mapped onto the first type memory 121. In the case where data of a storage space to be released have been updated, the media controller 123 may flush the updated data to the second type memory 122.

The SPD device 125 may communicate with the external host device through a corresponding channel of the sub-channels SCH. For example, when the first memory module 120 is initialized, the SPD device 125 may provide information stored therein to the external host device through the corresponding channel of the sub-channels SCH.

For example, the SPD device 125 may store information about a storage capacity to be provided to the external host device as a storage space of the first memory module 120. For example, the SPD device 125 may store information about the storage capacity of the second type memory 122. During initialization, the SPD device 125 may provide information about the storage capacity of the second type memory 122 to the external host device.

For example, the capacity information stored in the SPD device 125 may include information about a storage capacity of the second type memory 122. The storage capacity of the second type memory 122 may include a user capacity, a meta capacity, and/or a reserved capacity. The user capacity may be a storage capacity which the second type memory 122 provides to the external host device.

The meta capacity may be a storage capacity which is used to store various meta information for managing the second type memory 122 and may not be disclosed to the external host device. The reserved capacity may be a storage capacity which is secured to manage the second type memory 122 and which may not be disclosed to the external host device.

The capacity information stored in the SPD device 125 may include information about the user capacity of the second type memory 122. Below, even though not separately described, the capacity of the second type memory 122 may be understood as indicating the user capacity of the second type memory 122.

The third memory module 140 may include a first type memory 141 and an SPD device 145. The fourth memory module 150 may include a first type memory 151 and an SPD device 155. Below, the second type memory modules 140 and 150 will be described with reference to the third memory module 140.

The first type memory 141 may include a dynamic random access memory like the first type memory 121 of the first memory module 120. In some embodiments, the first type memory 141 of the third memory module 140 may be a high speed volatile memory of a different type than the first type memory 121 of the first memory module 120. The SPD device 145 may communicate with an external host device, for example, the memory controller 111 and/or the processor 110, through a corresponding channel of the sub-channels SCH. For example, when the third memory module 140 is initialized, the SPD device 145 may provide information stored therein to the external host device through the corresponding channel of the sub-channels SCH.

For example, the SPD device 145 may store information about a storage capacity provided to the external host device as a storage space of the third memory module 140. For example, the SPD device 145 may store information about the storage capacity of the first type memory 141. During initialization, the SPD device 145 may provide information about the storage capacity of the first type memory 141 to the external host device.

When a power is supplied to the memory system 100, the memory controller 111 may perform initialization on the first to fourth memory modules 120 to 150. For example, the SPD devices 125 to 155 of the first to fourth memory modules 120 to 150 may provide the capacity information to the memory controller 111 through the sub-channels SCH, respectively.

The SPD devices 125 and 135 of the first type memory modules 120 and 130 may provide the pieces of capacity information of the second type memories 122 and 132 to the memory controller 111, respectively. The SPD devices 145 and 155 of the second type memory modules 140 and 150 may provide the pieces of capacity information of the first type memories 141 and 151 to the memory controller 111, respectively. For example, the memory controller 111 may read the storage capacities from the SPD devices 125 to 155, respectively.

Figure 2:
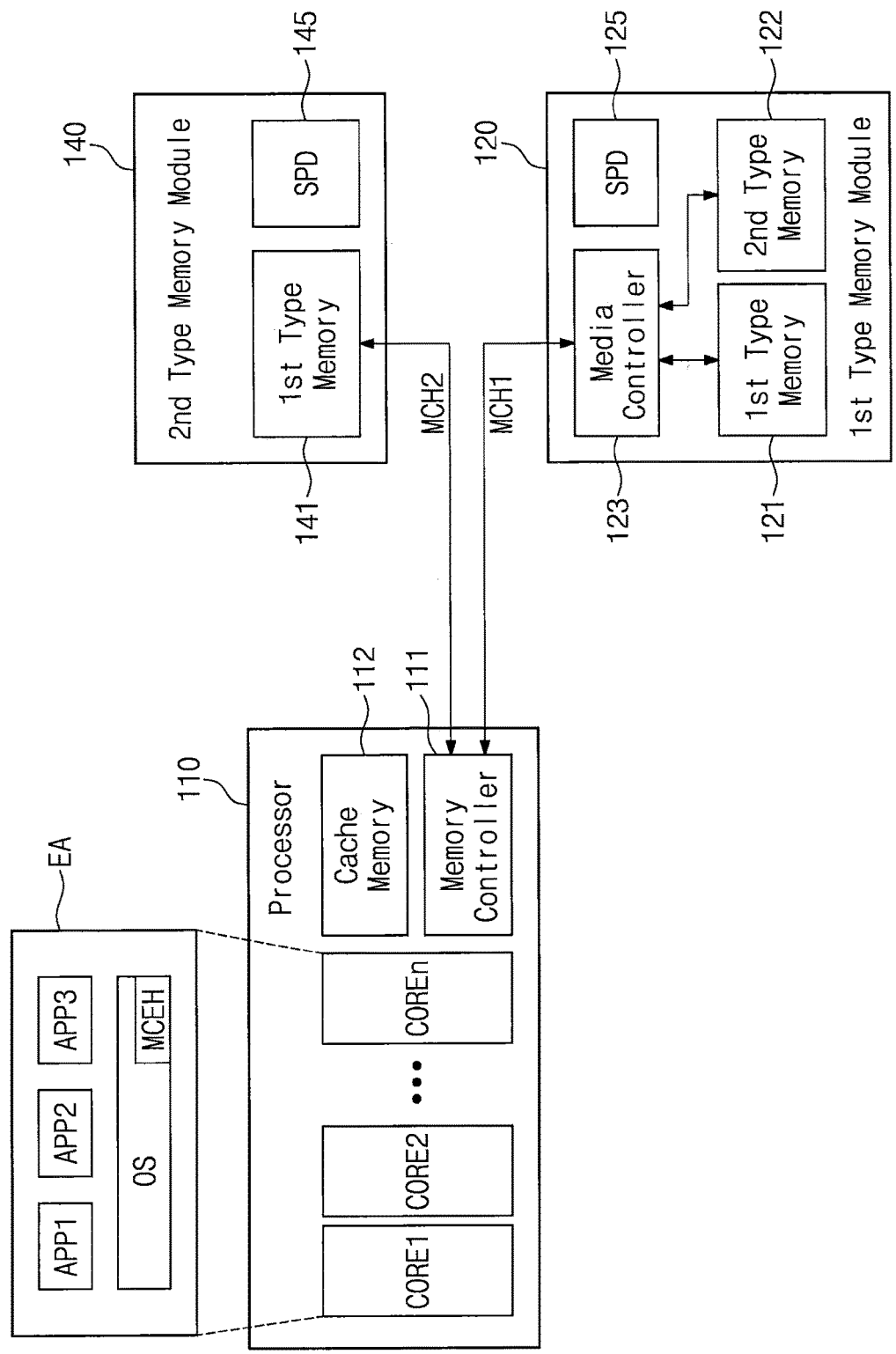
FIG. 2 is a diagram illustrating an example in which a processor accesses first and third memory modules.

FIG. 2 is a diagram illustrating an example in which the processor 110 accesses the first and third memory modules 120 and 140. For simplicity, any other components except for the processor 110, the first memory module 120, and the third memory module 140 are omitted.

Referring to FIGS. 1 and 2, the processor 110 may include first to n-th cores CORE1 to COREn. That is, the processor 110 may be a multi-core processor. Objects which are executed by the first to n-th cores CORE1 to COREn are illustrated in an execution area EA.

Referring to the execution area EA, an operating system OS may be executed in the processor 110. Also, on the basis of the support of the operating system OS, first to third applications APP1 to APP3 may be executed in the processor 110.

The operating system OS may include and/or be in communication with a machine check exception handler MCEH. The machine check exception handler MCEH may process an error occurring when the memory controller 111 accesses the first to fourth memory modules 120 to 150. An operation of the machine check exception handler MCEH will be more fully described with reference to FIG. 3.

The memory controller 111 may access the first to fourth memory modules 120 to 150 depending on a request of the first to n-th cores CORE1 to COREn. For example, the memory controller 111 may access the first memory module 120 through a first main channel MCH1, and may access the third memory module 140 through a second main channel MCH2.

Figure 3:
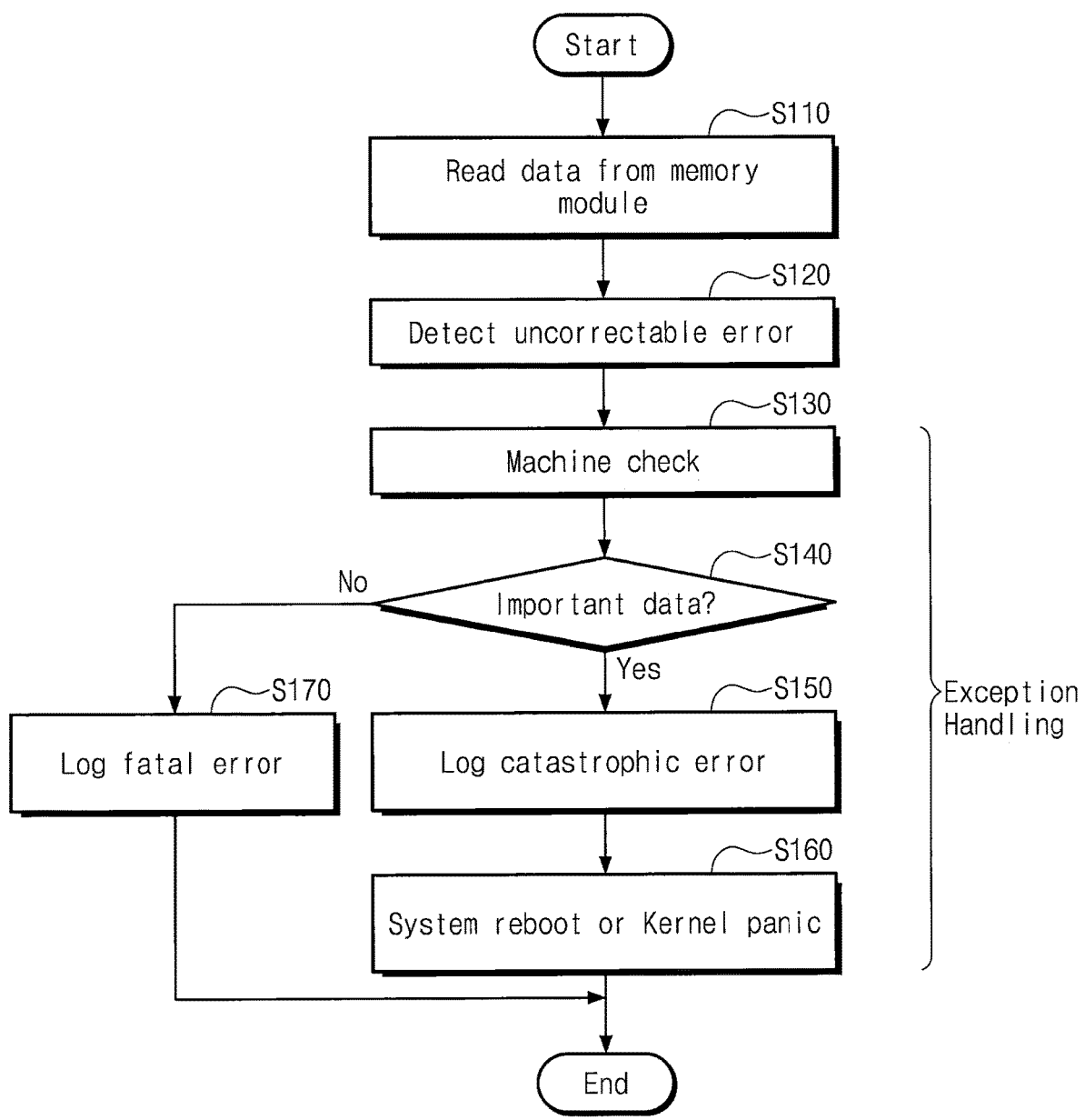
FIG. 3 is a flowchart illustrating an operating method of a memory system according to a first example of the inventive concepts.

FIG. 3 is a flowchart illustrating an operating method of the memory system 100 according to a first example of the inventive concepts. Referring to FIGS. 1 to 3, in operation S110, the memory controller 111 may read data from one memory module of the first to fourth memory modules 120 to 150. For example, the memory controller 111 may read data depending on a request of the first to third applications APP1 to APP3 or the operating system OS.

In operation S120, the memory controller 111 may detect an uncorrectable error. For example, the memory controller 111 may perform error correction decoding on the read data. Depending on a result of the error correction decoding, the memory controller 111 may correct an error or may detect an uncorrectable error.

For example, when the read data includes a number of error bits that exceeds the number of error bits correctable through the error correction decoding, the uncorrectable error may be detected. For example, the memory controller 111 may perform a retry of the read operation for a specific number of times. In the case where the uncorrectable error is detected even though the read retry is repeatedly performed, exception handling may be performed.

For example, the exception handling may be executed as one core of the first to n-th cores CORE1 to COREn in the processor 110 arrives at and executes the machine check exception handler MCEH. The exception handling may include operation S130 to operation S170.

In operation S130, the machine check exception handler MCEH may perform a machine check. For example, the machine check may include determining whether the memory controller 111 or the first memory module 120 is operating normally or abnormally. The machine check may include determining whether the detected error is a fatal error or a catastrophic error.

For example, when an uncorrectable error occurs in important data, the detected error may be determined to be the catastrophic error. Data which are needed to control or operate the memory system 100 may be the important data. Data which are requested by the first to third applications APP1 to APP3 or the operating system OS and will be used by the first to third applications APP1 to APP3 or the operating system OS may include the important data.

For example, when an uncorrectable error occurs in unimportant data, the detected error may be determined to be the fatal error. Data which are not associated with controlling or operating the memory system 100 may be the unimportant data. Data which are requested by the first to third applications APP1 to APP3 or the operating system OS and will not be used by the first to third applications APP1 to APP3 or the operating system OS may be the unimportant data.

When it is determined in operation S140 that the uncorrectable data are important data, the machine check exception handler MCEH performs operation S150. In operation S150, the machine check exception handler MCEH may record the event that the catastrophic error occurred in an error log. Afterwards, in operation S160, a system reboot or a kernel panic of the memory system 100 may occur.

When it is determined in operation S140 that the uncorrectable data are unimportant data, the machine check exception handler MCEH performs operation S170. In operation S170, the machine check exception handler MCEH may record the event that the fatal error occurred in the error log.

Figure 4:
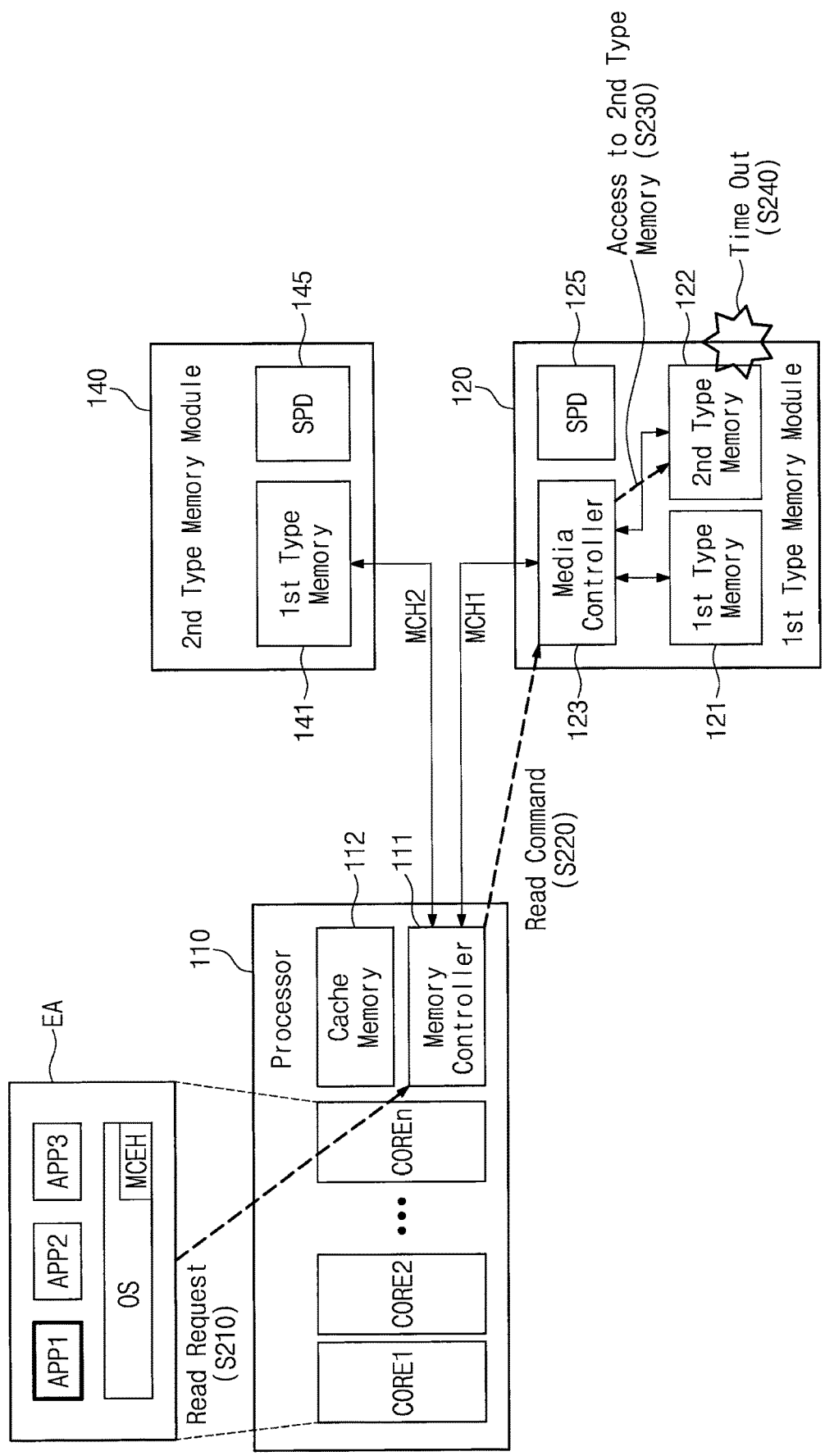
FIG. 4 is a diagram illustrating an example of reading data from a first memory module.

FIG. 4 is a diagram illustrating an example of reading data from the first memory module 120. Referring to FIGS. 1 and 4, in operation S210, for example, the first application APP1 may transfer a read request for the first memory module 120 to the memory controller 111. The read request may be transferred to the memory controller 111 through the operating system OS and one or more of the first to n-th cores CORE1 to COREn.

In operation S220, the memory controller 111 may transfer a read command to the first memory module 120. In operation S230, the read command may cause an access to the second type memory 122. For example, in the case where data corresponding to the read command are not mapped onto the first type memory 121, the media controller 123 may read the data from the second type memory 122 and may map the read data onto the first type memory 121.

The procedure in which the memory controller 111 accesses the first memory module 120 is the same as the procedure in which the memory controller 111 accesses the third memory module 140. For example, a time condition from a time when the memory controller 111 transfers the read command to the first memory module 120 to a time when the memory controller 111 receive data may be determined based on an access speed of the first type memory 121 or 141.

An access speed of the second type memory 122 is slower than the access speed of the first type memory 121. Accordingly, in operation S240, a time out event in which data are not read from the second type memory 122 until a time corresponding to the time condition of the memory controller 111 elapses may occur.

For example, even though the first memory module 120 does not transfer data to the first main channel MCH1, the memory controller 111 may detect data from voltages of the first main channel MCH1. In this case, the memory controller 111 may determine that data having an uncorrectable error are received.

For another example, as the time corresponding to the time condition elapses, the first memory module 120 may transfer dummy data to the first main channel MCH1. The memory controller 111 may receive the dummy data through the first main channel MCH1. The memory controller 111 may determine that the dummy data have an uncorrectable error. For example, the dummy data may be data having a specific pattern or any pattern.

Figure 5:
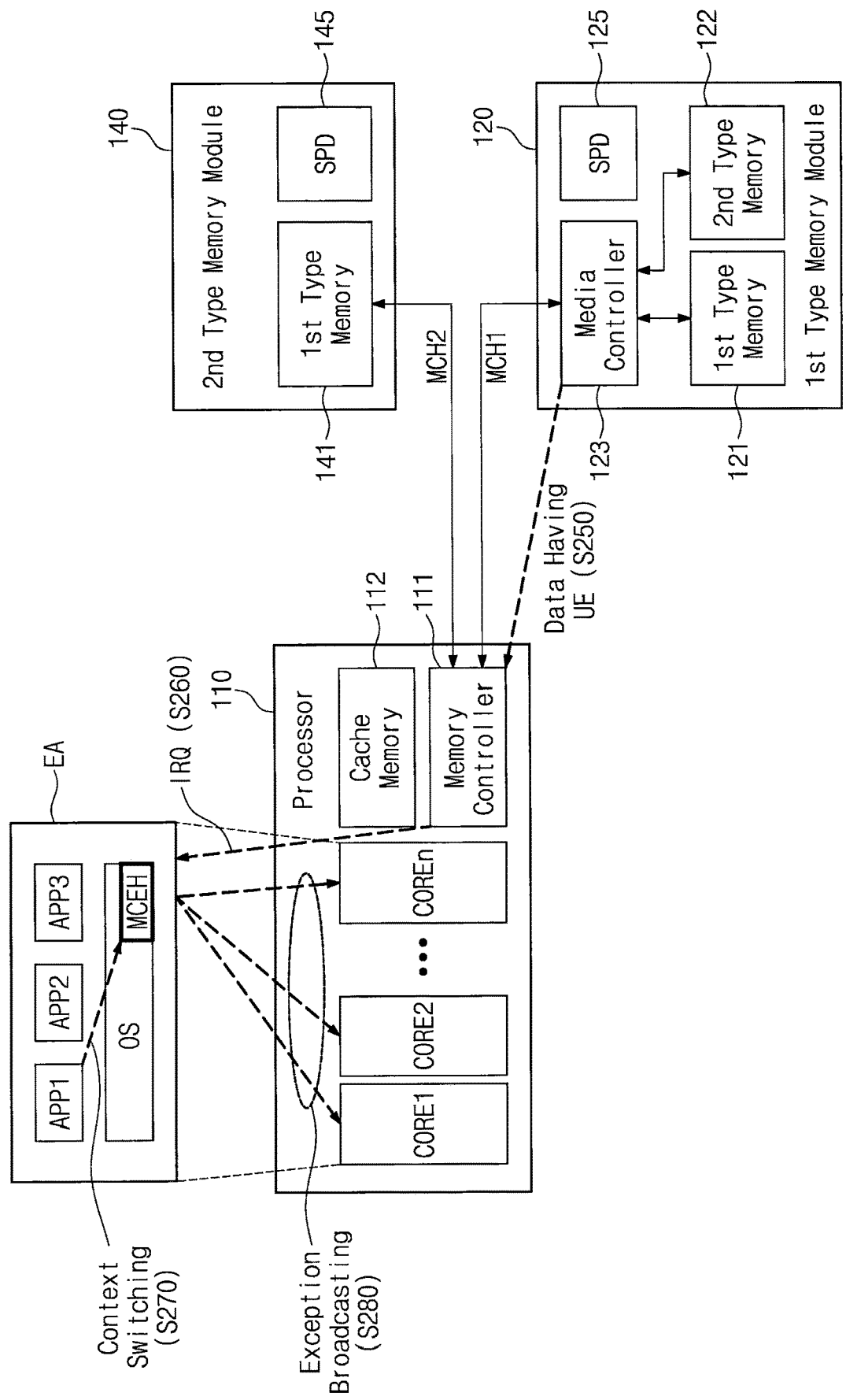
FIG. 5 is a diagram illustrating an example in which exception handling is performed on a first memory module.

FIG. 5 is a diagram illustrating an example in which exception handling is performed on the first memory module 120. In an embodiment, FIG. 5 shows operations following operation S240 of FIG. 4. Referring to FIGS. 1 and 5, in operation S250, the memory controller 111 receives data having an uncorrectable error UE from the first memory module 120.

For example, as described above, the media controller 123 may not transfer data to the memory controller 111 or may transfer dummy data to the memory controller 111. The memory controller 111 may perform error correction decoding on the read data and may determine that the read data have an uncorrectable error.

When the uncorrectable error is detected, in operation S260, the memory controller 111 may output an interrupt signal IRQ. The interrupt signal IRQ may be transferred to at least one core of the first to n-th cores CORE1 to COREn. The interrupt signal IRQ may be transferred to the first application APP1 or the operating system OS of the execution area EA through the at least one core.

In response to the interrupt signal IRQ, in operation S270, context switching from the first application APP1 to the operating system OS and/or the machine check exception handler MCEH may be made. The operating system OS and/or the machine check exception handler MCEH may perform exception broadcasting of notifying the first to n-th cores CORE1 to COREn that the exception handling is required due to occurrence of exception.

For example, the exception broadcasting may be a call which allows the first to n-th cores CORE1 to COREn to execute the machine check exception handler MCEH. In some embodiments, the call may be provided as a hardware or software interrupt. Depending on the exception broadcasting, the first to n-th cores CORE1 to COREn may interrupt operations being currently performed and may access the machine check exception handler MCEH.

For example, the operations being currently performed may include processes, threads, tasks, operations, and/or a series of codes or commands. Each operation may include one or more interrupt points. At each interrupt point, a core which performs a relevant operation may be allowed to interrupt and resume the execution of the operation.

One core of the first to n-th cores CORE1 to COREn may execute the machine check exception handler MCEH to perform the exception handling. A core which performs the exception handling may be a monarchy core. The remaining cores of the first to n-th cores CORE1 to COREn other than the monarchy core may not execute the machine check exception handler MCEH.

The memory controller 111 accesses the first type memory 121 of the first memory module 120. The first type memory 121 may be a cache memory of the second type memory 122. That data read from the first memory module 120 are uncorrectable means that the corresponding data stored in the first type memory 121 have an uncorrectable error or that the corresponding data are not mapped onto the first type memory 121.

In the case where the data stored in the first type memory 121 have an uncorrectable error, the error may be cured by rewriting the corresponding data stored in the second type memory 122 to the first type memory 121. In the case where the corresponding data are not mapped onto the first type memory 121, the error may be cured by mapping the corresponding data stored in the second type memory 122 onto the first type memory 121.

That is, when the access to the second type memory 122 is completed, exact data may be read from the first memory module 120. However, according to the method described with reference to FIG. 3, when the access to the second type memory 122 is made in the first memory module 120, the memory system 100 (refer to FIG. 1) may enter the kernel panic or the system reboot.

To prevent the kernel panic or the system reboot from being performed when the access to the second type memory 122 is made in the first memory module 120, the memory system 100 according to an embodiment of the inventive concepts may perform the exception handling for the first memory module 120 depending on a second example different from the first example of FIGS. 3 through 6.

Figure 6:
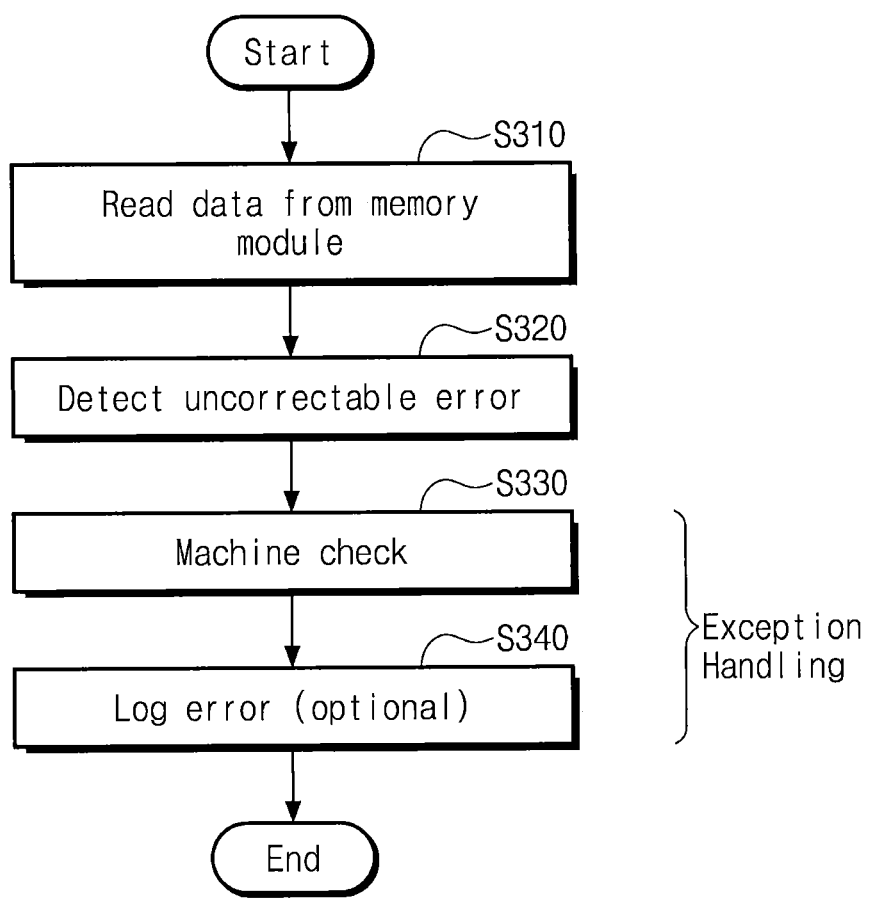
FIG. 6 is a flowchart illustrating an operating method according to a second example of the inventive concepts.

FIG. 6 is a flowchart illustrating an operating method according to a second example of the inventive concepts. Referring to FIGS. 1, 3, and 6, operation S310 to operation S330 are the same as operation S110 to operation S130 of FIG. 3. Thus, additional description associated with operation S310 to operation S330 will be omitted to avoid redundancy.

In operation S340, the machine check exception handler MCEH may record the event that an error associated with the first memory module 120 occurs, in the error log. For example, the machine check exception handler MCEH may record the fatal error or the catastrophic error in the error log. In an embodiment, operation S340 may be selectively performed. Operation S340 may be performed or may be omitted without execution. In an embodiment, in the machine check of operation S330, a function of determining whether the detected error is the fatal error or the catastrophic error may be omitted.

When the exception handling is completed, context switching from the machine check exception handler MCEH to the first application APP1 is performed. As described with reference to operation S210 of FIG. 4, the first application APP1 may again transfer the read request for the first memory module 120.

A first time may be taken to perform the context switching from the first application APP1 to the machine check exception handler MCEH. A second time may be taken to perform the machine check (operation S330). A third time may be taken to perform the context switching from the machine check exception handler MCEH to the first application APP1.

While the first time, the second time, and the third time pass, the media controller 123 may map data corresponding to the read command (refer to operation S220 of FIG. 4) onto the first type memory 121 from the second type memory 122. Accordingly, in the case where the memory controller 111 again transfers the read command to the first memory module 120 as the first application APP1 again transfers the read request, the memory controller 111 may read exact data from the first memory module 120.

As described with reference to FIG. 6, upon performing the exception handling on the first memory module 120, the machine check exception handler MCEH may not determine the fatal error or the catastrophic error and may not enter the kernel panic or the system reboot. Accordingly, even though the access to the second type memory 122 is required in the first memory module 120, the memory system 100 may obtain exact data from the first memory module 120 without experiencing the kernel panic or the system reboot.

In an embodiment, the exception handling according to the second example described with reference to FIG. 6 may be applied to the first type memory modules 120 and 130. Also, the exception handling according to the first example described with reference to FIG. 3 may be applied to the second type memory modules 140 and 150.

Figure 7:
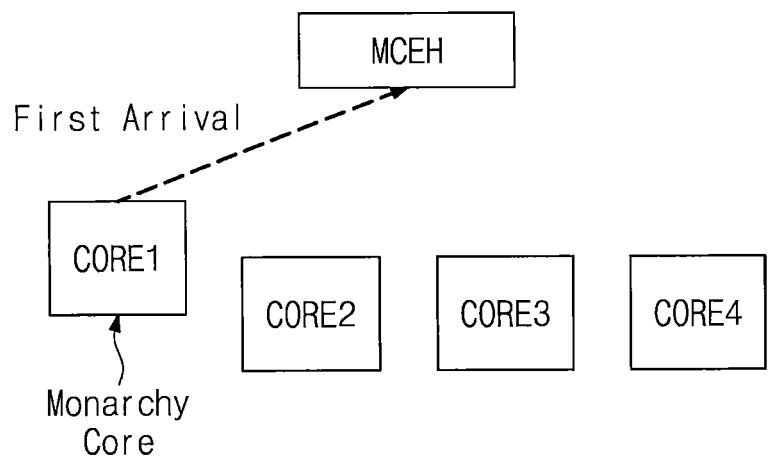
FIG. 7 is a diagram illustrating an example in which a monarchy core is assigned.

FIG. 7 is a diagram illustrating an example in which a monarchy core is assigned. In an embodiment, an example in which a monarchy core of the first to fourth cores CORE1 to CORE4 is assigned is illustrated in FIG. 7. Referring to FIGS. 5 and 7, the first to fourth cores CORE1 to CORE4 may interrupt operations being currently performed depending on the exception broadcasting (operation S280).

However, timings when the first to fourth cores CORE1 to CORE4 interrupt the operations may vary with kinds of the operations which the first to fourth cores CORE1 to CORE4 are performing. For example, interrupt points of threads which the first to fourth cores CORE1 to CORE4 is performing may be different from each other.

In an embodiment, the first core CORE1 of the first to fourth cores CORE1 to CORE4 may first interrupt an operation being performed and may respond to a call. The first core CORE1 which first responds to the call may be considered as first arriving at the machine check exception handler MCEH.

The first core CORE1 which first arrives at the machine check exception handler MCEH may be specified (or assigned) as the monarchy core. The first core CORE1 may execute the machine check exception handler MCEH to perform the exception handling described with reference to FIG. 3 or 6.

Figure 8:
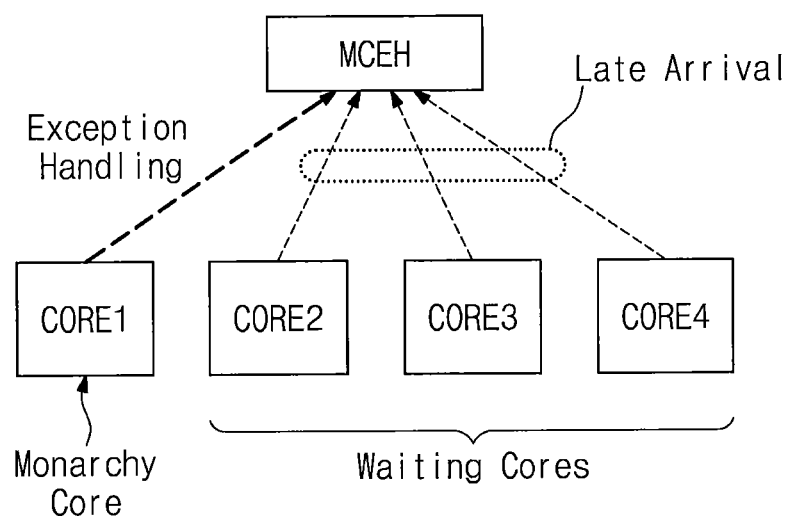
FIG. 8 is a diagram illustrating a first example in which remaining cores are managed.

FIG. 8 is a diagram illustrating a first example in which remaining cores are managed. Referring to FIG. 8, the second to fourth cores CORE2 to CORE4 may arrive at the machine check exception handler MCEH later than the first core CORE1. In an embodiment, the second to fourth cores CORE2 to CORE4 may wait until the first core CORE1 completes the exception handling.

The second to fourth cores CORE2 to CORE4 may be waiting cores. When the first core CORE1 completes the exception handling, the first to fourth cores CORE1 to CORE4 may return to the operations previously performed and interrupted. For example, when the exception handling is completed without the kernel panic or the system reboot, the first to fourth cores CORE1 to CORE4 may return to the operations previously performed and interrupted.

Like the exception handling described with reference to FIG. 6, in the case where the exception handling is completed without the kernel panic or the system reboot, an operation in which the second to fourth cores CORE2 to CORE4 wait causes a waste of resources. To prevent the waste of resources, the memory system 100 according to an embodiment of the inventive concepts provides a new algorithm to remove waiting cores.

Figure 9:
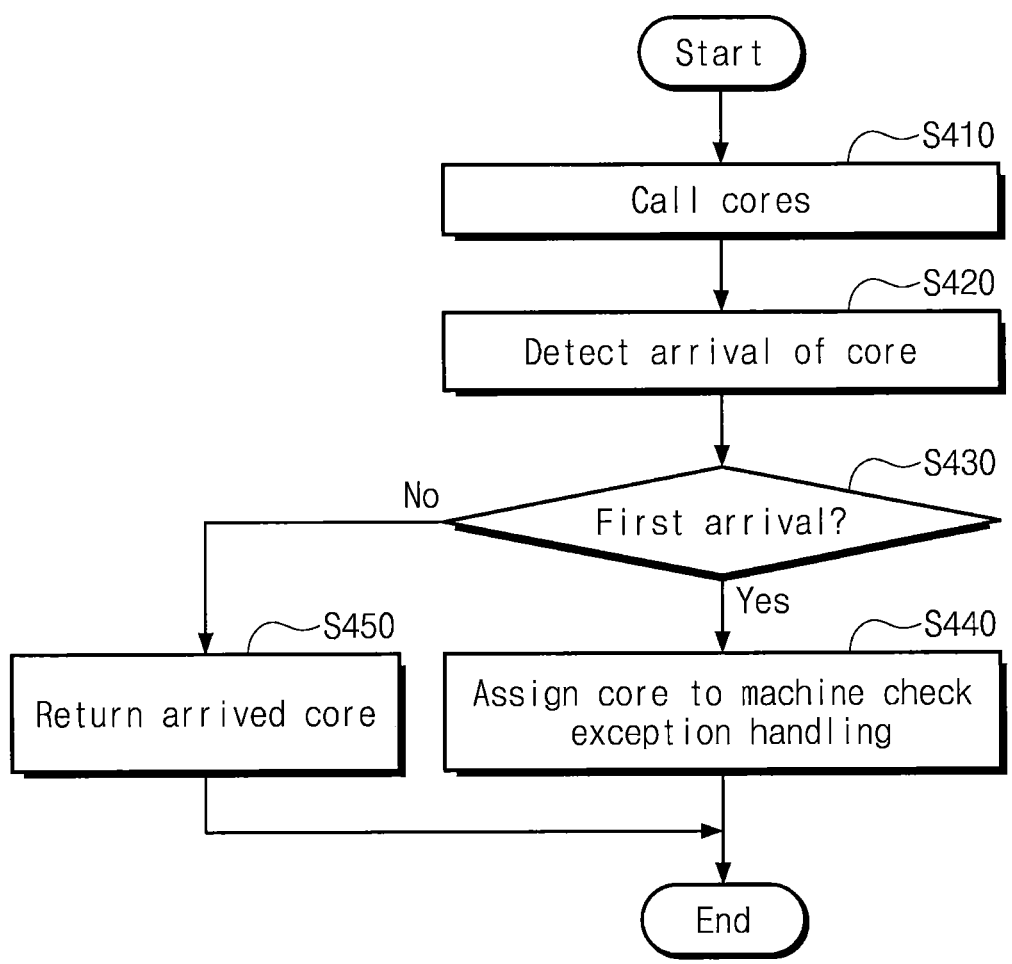
FIG. 9 is a diagram illustrating an example in which cores are managed for exception handling according to an embodiment of the inventive concepts.

FIG. 9 is a diagram illustrating an example in which cores are managed for exception handling according to an embodiment of the inventive concepts. Referring to FIGS. 5 and 9, in operation S410, the operating system OS or the machine check exception handler MCEH may call the cores CORE1 to COREn through the exception broadcasting (operation S280).

In operation S420, the machine check exception handler MCEH may detect the arrival of a core. For example, when a specific core interrupts an operation being performed and responds to the call, the specific core may be considered as an arrived core. In operation S430, the operating system OS or the machine check exception handler MCEH may determine whether an arrived core is a first core.

When it is determined in operation S430 that the arrived core is the first core to arrive, operation S440 is performed. In operation S440, the operating system OS and/or the machine check exception handler MCEH may assign (or specify) the arrived core to the machine check exception handler MCEH. For example, the arrived core may perform the exception handling by executing codes of the machine check exception handler MCEH. For example, the arrived core may perform the exception handling depending on the method described with reference to FIG. 3 or 6.

When it is determined in operation S430 that the arrived core is not the first core to arrive, operation S450 is performed. In operation S450, the operating system OS and/or the machine check exception handler MCEH may allow the arrived core to return to the interrupted operation. The arrived core may return to the interrupted operation to resume the interrupted operation.

Figure 10:
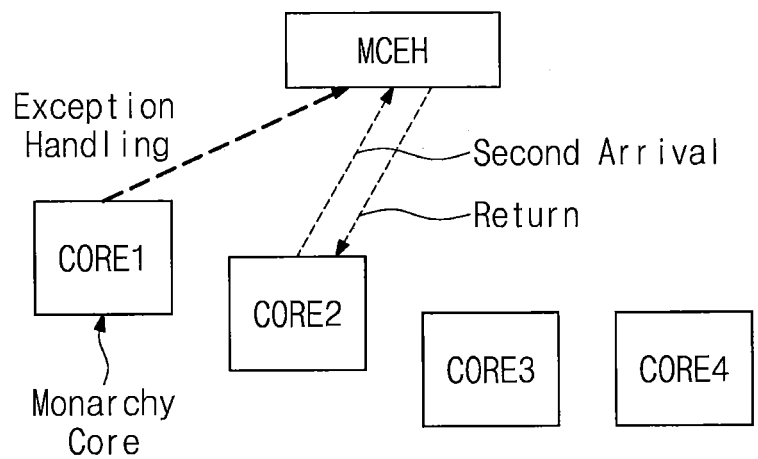
FIG. 10 is a diagram illustrating a second example in which remaining cores are managed.

FIG. 10 is a diagram illustrating a second example in which remaining cores are managed. In an embodiment, an example in which remaining cores are managed after the first core CORE1 is specified as a monarchy core in FIG. 7 is illustrated in FIG. 10. Referring to FIGS. 1 and 10, the second to fourth cores CORE2 to CORE4 may arrive at the machine check exception handler MCEH later than the first core CORE1.

In an embodiment, the second core CORE2 may arrive at the machine check exception handler MCEH just following the first core CORE1, that is, for the second time. As the second core CORE2 recognizes that the first core CORE1 is already specified as a monarchy core, the second core CORE2 may return to the interrupted operation and may resume the interrupted operation (operation S450 of FIG. 9). For example, the second core CORE2 may execute codes of the interrupted operation from an interrupt point of the interrupted operation.

Likewise, the third and fourth cores CORE3 and CORE4 may arrive at the machine check exception handler MCEH later than the first core CORE1. As the third and fourth cores CORE3 and CORE4 recognize that the first core CORE1 is already specified as a monarchy core, the third and fourth cores CORE3 and CORE4 may respectively return to the interrupted operations and may respectively resume the interrupted operations (operation S450 of FIG. 9).

As described with reference to FIG. 6, upon performing the exception handling on the first memory module 120, the fatal error or the catastrophic error may not occur. If the exception handling for the first memory module 120 is completed, the monarchy core returns to the interrupted operation. Since the fatal error or the catastrophic error does not occur upon performing the exception handling on the first memory module 120, the second to fourth cores CORE2 to CORE4 need to wait the completion of the exception handling.

Accordingly, the second to fourth cores CORE2 to CORE4 may return to the interrupted operations while the first core CORE1 completes the exception handling. As the second to fourth cores CORE2 to CORE4 return to the interrupted operations more easily, a waste of resources of the second to fourth cores CORE2 to CORE4 is reduced and/or prevented, and the performance of the memory system 100 is improved.

In an embodiment, the first type memory modules 120 and 130 may store (or back up) data to the second type memories 122 and 132, respectively, and the media controllers 123 and 133 may include separate error correction means for the second type memories 122 and 132. Accordingly, the first type memory modules 120 and 130 may secure error-free data.

That is, as described with reference to FIG. 6, the method in which the kernel panic and the system reboot do not occur in the exception handling may be applied to the first type memory modules 120 and 130. Also, as described with reference to FIG. 10, the method in which the second to fourth cores CORE2 to CORE4 return to the interrupted operations while the first core CORE1 performs the exception handling may be applied to the first type memory modules 120 and 130.

In contrast, the second type memory modules 140 and 150 include only the first type memories 141 and 151, and do not include error correction means for the first type memories 141 and 151. Accordingly, an uncorrectable error may occur in data stored in the first type memories 141 and 151.

That is, as described with reference to FIG. 3, the method in which the kernel panic and the system reboot occur in the exception handling may be applied to the second type memory modules 140 and 150. Also, as described with reference to FIG. 8, the method in which the second to fourth cores CORE2 to CORE4 wait to cope with the kernel panic or the system reboot while the first core CORE1 performs the exception handling may be applied to the first type memory modules 120 and 130.

Figure 11:
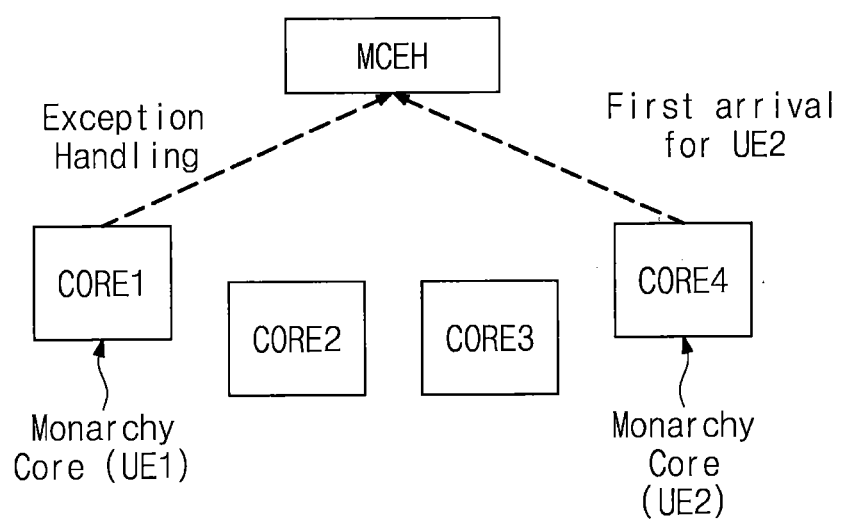
FIG. 11 is a diagram illustrating an example in which another exception handling occurs while a first core performs exception handling.

FIG. 11 is a diagram illustrating an example in which another exception handling occurs while the first core CORE1 performs exception handling. Referring to FIGS. 1 and 11, while the first core CORE1 performs the exception handling on a first uncorrectable error UE1 occurring in the first memory module 120, a second uncorrectable error UE2 may occur in one memory module of the second to fourth memory modules 130 to 150.

As described with reference to FIG. 5, when the exception broadcasting (operation S280) is performed on the second uncorrectable error UE2, the cores CORE1 to CORE4 may be called. The first core CORE1 which performs the exception handling does not respond to the call. The second to fourth cores CORE2 to CORE4 which do not perform the exception handling may respond to the call.

For example, as the fourth core CORE4 first responds to the call, the fourth core CORE4 may first arrive at the machine check exception handler MCEH. Accordingly, the fourth core CORE4 may be specified (or assigned) as a monarchy core for the second uncorrectable error UE2. The fourth core CORE4 may perform the exception handling on the second uncorrectable error UE2.

Figure 12:
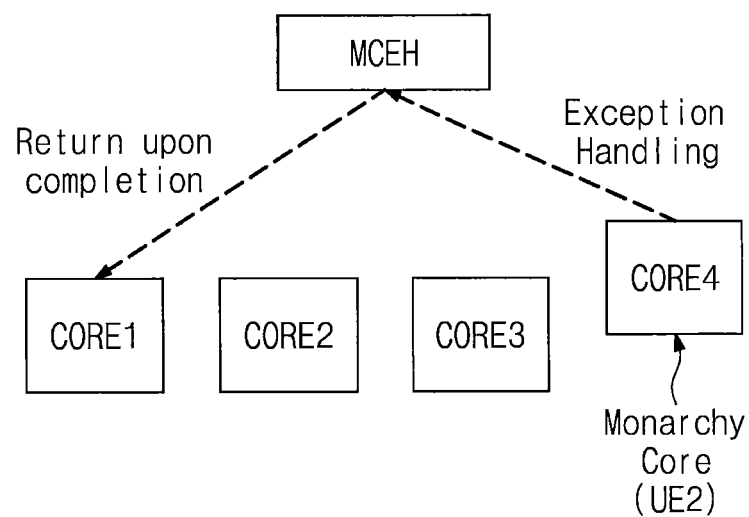
FIG. 12 is a diagram illustrating an example in which a first core completes exception handling after a state of FIG. 11.

FIG. 12 is a diagram illustrating an example in which the first core CORE1 completes exception handling after a state of FIG. 11. Referring to FIGS. 1 and 12, while the fourth core CORE4 performs the exception handling on the second uncorrectable error UE2, the first core CORE1 may complete the exception handling. When the exception handling is completed, the first core CORE1 may return to an interrupted operation (or an operation previously performed and interrupted) regardless of the event that the fourth core CORE4 performs the exception handling.

In the case where the first core CORE1 returns to the interrupted operation without waiting until the exception handling of the fourth core CORE4 is completed, a waste of resources in the memory system 100 may be further prevented, and the performance of the memory system 100 may be further improved.

Figure 13:
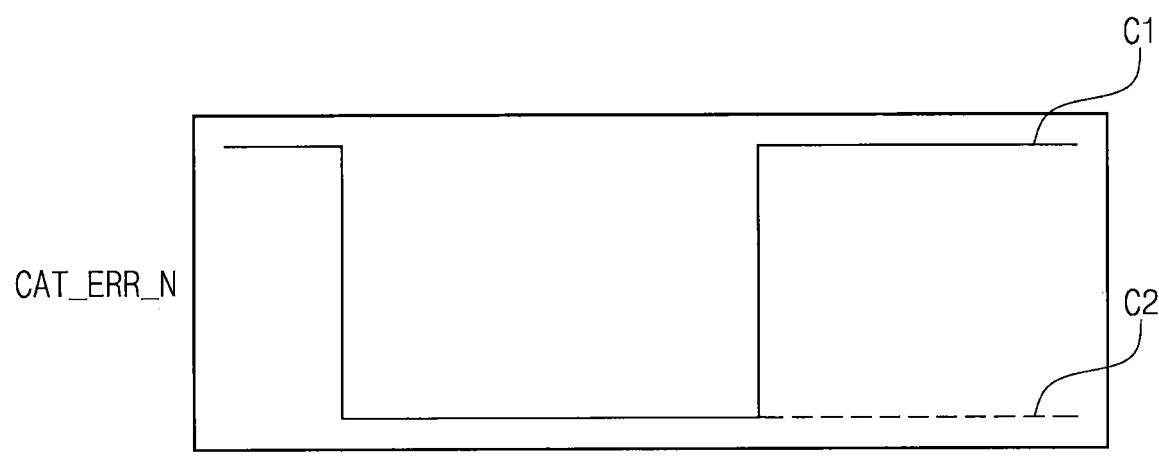
FIG. 13 is a diagram illustrating a first example of an error signal that cores or a processor generates.

FIG. 13 is a diagram illustrating a first example of an error signal CAT_ERR_N that the cores CORE1 to COREn and/or the processor 110 generates. Referring to FIGS. 1 and 13, the error signal CAT_ERR_N may be controlled in the form of a first line C1 and/or a second line C2.

For example, when the memory controller 111 detects an uncorrectable error, the error signal CAT_ERR_N may transition from a high level to a low level. In the case where the uncorrectable error is not a catastrophic error but a fatal error, the error signal CAT_ERR_N may transition from the low level to the high level like the first line C1.

In the case where the uncorrectable error is the catastrophic error, like the second line C2, the error signal CAT_ERR_N may be maintained at the low level until the system reboot is performed. In the case where the uncorrectable error is an error occurring in the first type memory modules 120 and 130, as described with reference to FIG. 6, the kernel panic or the system reboot may not occur.

For example, the uncorrectable error associated with the first type memory modules 120 and 130 may be set to the fatal error or no error. Accordingly, as described with reference to the first line C1, the error signal CAT_ERR_N may transition from the low level to the high level.

Figure 14:
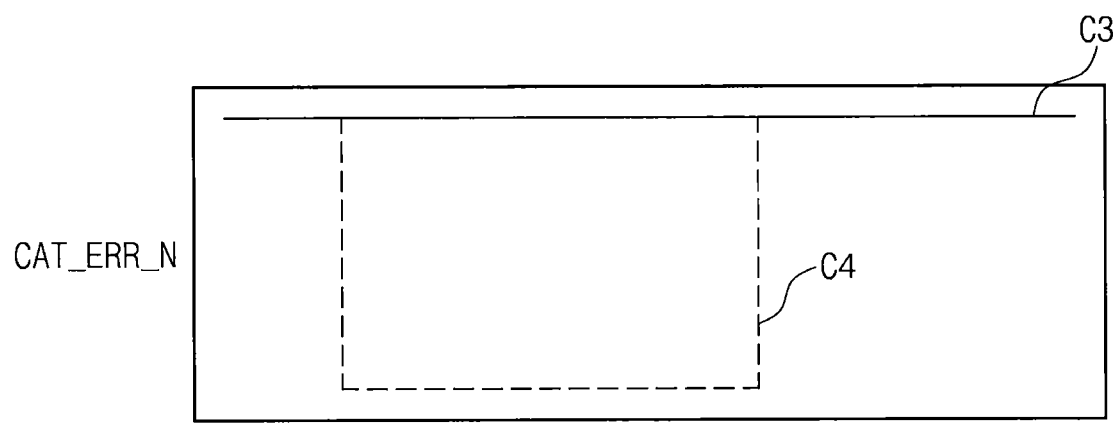
FIG. 14 is a diagram illustrating a second example of an error signal that cores or a processor generates.

FIG. 14 is a diagram illustrating a second example of the error signal CAT_ERR_N that the cores CORE1 to COREn and/or the processor 110 generates. Referring to FIGS. 1 and 14, the error signal CAT_ERR_N may be controlled in the form of a third line C3 and/or a fourth line C4.

For example, when the memory controller 111 detects an uncorrectable error and the uncorrectable error is not a catastrophic error but a fatal error, like the third line C3, the error signal CAT_ERR_N may maintain the high level.

When the memory controller 111 detects an uncorrectable error and the uncorrectable error is the catastrophic error, like the fourth line C4, the error signal CAT_ERR_N may transition from the high level to the low level. In the case where the system reboot is performed, the error signal CAT_ERR_N may return to the high level.

For example, the uncorrectable error associated with the first type memory modules 120 and 130 may be set to the fatal error or no error. Accordingly, as described with reference to the third line C3, the error signal CAT_ERR_N may maintain the high level.

Figure 15:
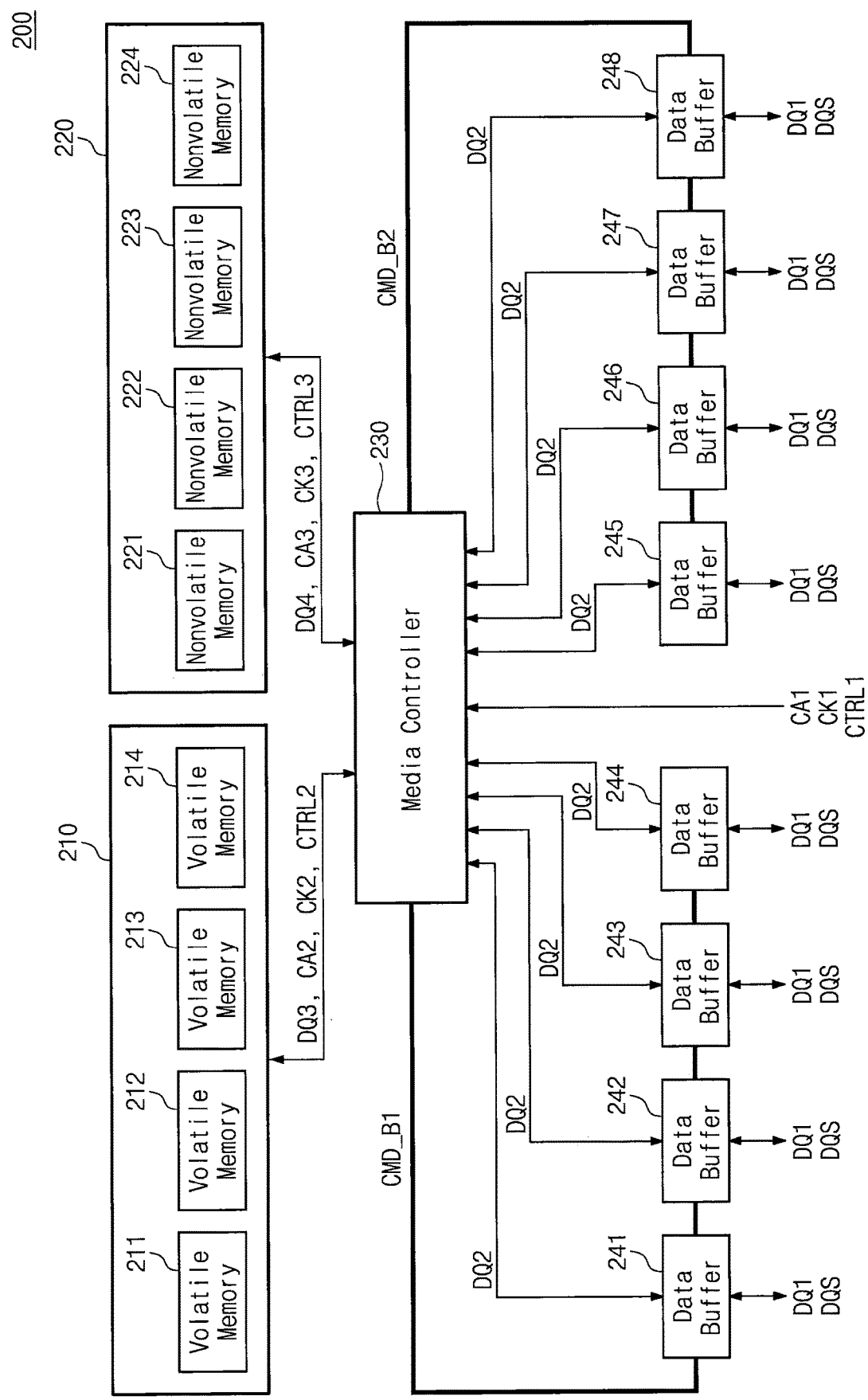
FIG. 15 is a block diagram illustrating a first type memory module according to an embodiment of the inventive concepts.

FIG. 15 is a block diagram illustrating a first type memory module 200 according to an embodiment of the inventive concepts. In an embodiment, the first type memory module 200 may be a memory module based on the LRDIMM standard. Referring to FIGS. 1 and 15, the first type memory module 200 includes a volatile memory device 210, a nonvolatile memory device 220, a media controller 230, and first to eighth data buffers 241 to 248.

The volatile memory device 210 includes first to fourth volatile memories 211 to 214. The first to fourth volatile memories 211 to 214 may be implemented with packages separated from each other. The first to fourth volatile memories 211 to 214 may include dynamic random access memories. The volatile memory device 210 may be the first type memory 121 and/or 131.

The nonvolatile memory device 220 includes first to fourth nonvolatile memories 221 to 224. The first to fourth nonvolatile memories 221 to 224 may be implemented with packages separated from each other. The first to fourth nonvolatile memories 221 to 224 may be storage areas of the nonvolatile memory device 220, which are identified by different addresses. The nonvolatile memory device 220 may be the second type memory 122 and/or 132.

The nonvolatile memory device 220 may include at least one of various nonvolatile memory devices such as a flash memory device, a phase change memory device, a ferroelectric memory device, a resistive memory device, and/or a magneto-resistive memory device.

The media controller 230 may receive a first command and address CA1, a first clock signal CK1, and a first control signal CTRL1 (e.g., from the memory controller 111). The media controller 230 may exchange second data signals DQ2 with the first to eighth data buffers 241 to 248. The media controller 230 may access the volatile memory device 210 or the nonvolatile memory device 220 depending on the first command and address CA1, the first clock signal CK1, and the first control signal CTRL1.

The media controller 230 may transfer a second command and address CA2, a second clock signal CK2, and a second control signal CTRL2 to the volatile memory device 210 and may exchange third data signals DQ3 with the volatile memory device 210. The media controller 230 may transfer a third command and address CA3, a third clock signal CK3, and a third control signal CTRL3 to the nonvolatile memory device 220 and may exchange fourth data signals DQ4 with the nonvolatile memory device 220.

In an embodiment, the first command and address CA1, the second command and address CA2, and the third command and address CA3 may have different formats. For another example, at least two of the first command and address CA1, the second command and address CA2, and the third command and address CA3 may have the same format. For example, a format which the media controller 230 uses to communicate with the volatile memory device 210 may be different from a format which the media controller 230 uses to communicate with the nonvolatile memory device 220.

The media controller 230 may transfer a first buffer command CMD_B10 to control the first to fourth data buffers 241 to 244. The media controller 230 may transfer a second buffer command CMD_B2 to control the fifth to eighth data buffers 245 to 248.

The first to eighth data buffers 241 to 248 may exchange first data signals DQ1 (e.g., with the memory controller 111) in synchronization with data strobe signals DQS. The first to eighth data buffers 241 to 248 may transfer the received first data signals DQ1 (e.g., from the memory controller 111) to the media controller 230 as the second data signals DQ2.

The first to eighth data buffers 241 to 248 may transfer the second data signals DQ2 received from the media controller 230 as the first data signals DQ1 (e.g., to the memory controller 111). The first to eighth data buffers 241 to 248 may be implemented with packages separated from each other.

In an embodiment, the volatile memory device 210 may be used as a cache memory of the nonvolatile memory device 220. A portion of a storage space of the nonvolatile memory device 220 may be mapped onto the volatile memory device 210.

When a first storage space indicated by the first command and address CA1 received (e.g., from the memory controller 111) has been mapped onto the volatile memory device 210, that is, when a cache hit occurs, the media controller 230 may transfer the second command and address CA2 to the volatile memory device 210. The volatile memory device 210 may perform a read or write operation depending on the second command and address CA2.

When the first storage space indicated by the first command and address CA1 received from the memory controller 111 is not mapped onto the volatile memory device 210, that is, when a cache miss occurs, the media controller 230 may map the first storage space indicated by the first command and address CA1 onto the volatile memory device 210.

For example, a second storage space associated with the first storage space of the nonvolatile memory device 220 may be secured for the volatile memory device 210. When a storage space of the volatile memory device 210 is insufficient, the media controller 230 may secure a storage space at the volatile memory device 210 by discarding any other storage space mapped onto the volatile memory device 210 or returning (e.g., writing back) any other storage space to the nonvolatile memory device 220.

In the case where data have been stored in the first storage space of the nonvolatile memory device 220, the media controller 230 may copy data of the first storage space to the second storage space of the volatile memory device 210. Afterwards, the media controller 230 may transfer the second command and address CA2 to the volatile memory device 210. The volatile memory device 210 may perform a read or write operation on the second storage space in response to the second command and address CA2.

When intending to release the second storage space from the volatile memory device 210, the media controller 230 may check whether the second storage space is dirty (e.g., has been modified). For example, when a write operation is performed on the second storage space, the second storage space may be determined as being dirty.

In the case where the second storage space is not dirty, the media controller 230 may release the second storage space by discarding data of the second storage space. In the case where the second storage space is dirty, the media controller 230 may return the second storage space by writing data of the second storage space to the nonvolatile memory device 220. After the second storage space is returned, the media controller 230 may release the second storage space by discarding the second storage space.

For another example, the volatile memory device 210 and the nonvolatile memory device 220 may be directly accessed (e.g., by the memory controller 111). For example, when the first command and address CA1 or the first control signal CTRL1 indicates the volatile memory device 210, the media controller 230 may convey the second command and address CA2, the second clock signal CK2, and/or the second control signal CTRL2 to the volatile memory device 210.

When the first command and address CA1 and/or the first control signal CTRL1 indicates the nonvolatile memory device 220, the media controller 230 may convey the third command and address CA3, the third clock signal CK3, and/or the third control signal CTRL3 to the nonvolatile memory device 220.

In an embodiment, the number of volatile memories, the number of nonvolatile memories, and the number of data buffers are not limited. The number of volatile memories or nonvolatile memories may be the same as the number of data buffers. In some embodiments, the number of data buffers may be nine.

The media controller 230 may store mapping information between logical addresses and physical addresses to a meta storage area of the nonvolatile memory device 220. The first command and address CA1 received (e.g., from the memory controller 111) may be based on logical addresses of the nonvolatile memory device 220.

When the media controller 230 accesses the nonvolatile memory device 220 depending on the first command and address CA1, the media controller 230 may translate logical addresses to physical addresses depending on the mapping information. The media controller 230 may access the nonvolatile memory device 220 by using the translated physical addresses. That is, the third command and address CA3 may be based on physical addresses.

Cache assignment of the nonvolatile memory device 220 with regard to the volatile memory device 210 may be performed depending on logical addresses or physical addresses. That is, the second command and address CA2 may be based on logical addresses or physical addresses. The media controller 230 may determine a cache hit or a cache miss by using logical addresses or physical addresses.

According to the inventive concepts, upon accessing a nonvolatile memory of a storage class memory, a monarchy core of cores performs exception handling, and the remaining cores continue to perform operations previously performed. Accordingly, a memory system having improved performance by applying characteristics of the storage class memory and an operating method of the memory system are provided.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

While the inventive concepts have been described with reference to example embodiments thereof, it will be apparent to those of ordinary skill in the art that various changes and modifications may be made thereto without departing from the spirit and scope of the inventive concept as set forth in the following claims.

What is claimed is:

1. A memory system comprising:
a processor including cores and a memory controller; and
a first semiconductor memory module configured to communicate with the memory controller,
wherein the first semiconductor memory module comprises a nonvolatile memory, a random access memory, and a media controller configured to provide a storage space of the nonvolatile memory to the processor and to use the random access memory as a cache memory of the nonvolatile memory of the first semiconductor memory module,
wherein the cores receive a call to perform a first exception handling associated with a machine check exception in response to detection of a first uncorrectable error when the memory controller reads first data from the first semiconductor memory module,
wherein, responsive to determining that the first uncorrectable error is associated with an absence from the random access memory of the first data that is stored in the nonvolatile memory, a first monarchy core of the cores performs the first exception handling and remaining cores of the cores return to remaining operations previously performed, and
wherein the media controller is configured to map to the random access memory a portion of the nonvolatile memory corresponding to the first data while the first monarchy core performs the first exception handling.

2. The memory system of claim 1, wherein the first monarchy core is a core from among the cores that first interrupts an operation being performed to perform the first exception handling in response to the call for the first exception handling.

3. The memory system of claim 2, wherein the remaining cores return to the remaining operations previously performed responsive to determining that the first monarchy core exists.

4. The memory system of claim 1, further comprising:
a second semiconductor memory module configured to communicate with the memory controller,
wherein, while the first monarchy core performs the first exception handling, the cores receive a second call to further perform a second exception handling responsive to detection of a second error when the memory controller reads second data from the second semiconductor memory module.

5. The memory system of claim 4, wherein a core from the remaining cores that first interrupts an operation being performed to perform the second exception handling in response to the second call for the second exception handling is specified as a second monarchy core.

6. The memory system of claim 5, wherein other remaining cores of the remaining cores except for the second monarchy core return to other remaining operations previously performed responsive to determining that the second monarchy core exists.

7. The memory system of claim 5, wherein, when the first monarchy core completes the first exception handling while the second monarchy core performs the second exception handling, the first monarchy core returns to an operation previously performed.

8. The memory system of claim 1, wherein the first uncorrectable error is broadcast to the cores responsive to the media controller accessing the nonvolatile memory when the memory controller reads the first data.

9. The memory system of claim 8, wherein, while the first monarchy core performs the first exception handling, the media controller completes the accessing of the nonvolatile memory.

10. The memory system of claim 1, further comprising:
a second semiconductor memory module comprising a second random access memory,
wherein, responsive to determining that a second error is generated based on access by the memory controller to the second semiconductor memory module, a second monarchy core of the cores performs a second exception handling, different from the first exception handling, responsive to the second error, and the memory system enters a kernel panic or a system reboot depending on a type of the second error.

11. A memory system comprising:
a processor comprising cores and a memory controller; and
a first semiconductor memory module configured to communicate with the memory controller and comprising a nonvolatile memory and a first random access memory configured to be used as a cache memory of the nonvolatile memory,
wherein, responsive to determining that a first error is generated based on access of first data by the memory controller to the first semiconductor memory module comprising the nonvolatile memory, a first monarchy core of the cores performs a first machine check operation responsive to the first error and returns to an operation previously performed, even though the first error indicates a system reboot or a kernel panic.

12. The memory system of claim 11, wherein, after the first machine check operation is performed, the memory controller again reads the first data from the first semiconductor memory module.

13. The memory system of claim 11, further comprising:
a second semiconductor memory module comprising a second random access memory,
wherein, responsive to determining that a second error is generated based on access by the memory controller to the second semiconductor memory module, a second monarchy core of the cores performs a second machine check operation, different from the first machine check operation, responsive to the second error, and the memory system enters the kernel panic or the system reboot depending on a type of the second error.

14. The memory system of claim 11, wherein the first semiconductor memory module further comprises:
a media controller configured to control the nonvolatile memory and the first random access memory,
wherein, while the first monarchy core performs the first machine check operation, the media controller reads the first data from the nonvolatile memory and stores the first data to the first random access memory.

15. The memory system of claim 11, wherein the first monarchy core is a core from among the cores that first responds to detection of the first error.

16. The memory system of claim 15, wherein remaining cores of the cores other than the first monarchy core return to remaining operations previously performed responsive to determining that the first monarchy core exists.

17. The memory system of claim 11, wherein the first error is associated with a cache miss of the first data that is stored in the nonvolatile memory.

18. An operating method of a memory system which comprises a processor comprising cores, a memory controller, a first semiconductor memory module that is a first type of memory module, and a second semiconductor memory module that is a second type of memory module, different from the first type of memory module, the method comprising:
detecting, by the memory controller, a first error upon reading data from the first semiconductor memory module, wherein the first semiconductor memory module comprises a nonvolatile memory and a random access memory, and wherein the random access memory is configured to be used as a cache memory of the nonvolatile memory of the first semiconductor memory module;
interrupting, by the cores, operations being currently performed, for exception handling of the first error;
starting, by a monarchy core of the cores, the exception handling;
returning, by remaining cores of the cores other than the monarchy core, to remaining operations of the interrupted operations, before the exception handling is completed;
responsive to determining that the first error corresponds to access of the nonvolatile memory of the first semiconductor memory module, returning, by the monarchy core, to an operation of the interrupted operations when the exception handling is completed even though the first error indicates a system reboot or a kernel panic;
detecting a second error;
determining whether the second error is generated based on an access to the first type of memory module or the second type of memory module; and
responsive to determining that the second error is generated based on the access to the second type of memory module, entering the kernel panic or the system reboot depending on a type of the second error.

19. The method of claim 18, wherein the monarchy core is a core from among the cores that first responds to the exception handling.

20. The method of claim 18, further comprising:
responsive to the determining that the first error corresponds to the access of the nonvolatile memory of the first semiconductor memory module, retrying, by the memory controller, reading the data from the first semiconductor memory module after the monarchy core has completed the exception handling.

* * * * *